United States Patent [19]

Tuovinen et al.

[11] Patent Number: 4,469,493
[45] Date of Patent: Sep. 4, 1984

[54] METHOD AND APPARATUS FOR THE PURIFICATION OF GASES WHICH CONTAIN SOLID AND GASEOUS IMPURITIES

[75] Inventors: Frans H. Tuovinen; Kalervo Lehtola, both of Ulvila, Finland

[73] Assignee: Outokumpu Oy, Helsinki, Finland

[21] Appl. No.: 388,629

[22] Filed: Jun. 15, 1982

[30] Foreign Application Priority Data

Jun. 26, 1981 [FI] Finland .................. 812011

[51] Int. Cl.³ .................. B01D 47/00
[52] U.S. Cl. .................. 55/89; 55/92; 55/94; 55/235; 55/242; 261/116; 261/117; 261/DIG. 54; 423/242
[58] Field of Search .................. 55/84, 89, 90, 92–94, 55/228, 235–238, 257 R, 242; 261/115–118, DIG. 54, 17, DIG. 9, 79 A; 110/203, 215, 216; 423/242

[56] References Cited

U.S. PATENT DOCUMENTS

| | | | |
|---|---|---|---|
| 2,575,359 | 11/1951 | Ortgies | 55/238 |
| 2,696,275 | 12/1954 | Pring | 55/238 |
| 3,456,928 | 7/1969 | Selway | 55/239 |
| 3,773,472 | 11/1973 | Hausberg et al. | 261/DIG. 54 |
| 3,877,488 | 4/1975 | Baturay et al. | 261/DIG. 54 |
| 4,328,011 | 5/1982 | Geides et al. | 55/93 |
| 4,374,813 | 2/1983 | Chen et al. | 55/90 |

FOREIGN PATENT DOCUMENTS 2452311 10/1980 France .................. 55/240
23471 2/1976 Japan .................. 55/84

Primary Examiner—Bernard Nozick
Attorney, Agent, or Firm—Abelman, Frayne, Rezac & Schwab

[57] ABSTRACT

The invention relates to a method and apparatus for the purification of gases, and especially to the purification of industrial flue gases, of solid and/or gaseous impurities. In the method, the gases are scrubbed during a scrubbing stage by spraying into them scrubbing liquid and water, and the drops of liquid are removed from the gases during a drop separation stage. Prior to the scrubbing stage the hot gases are moistened in a pre-moistening stage by spraying into them scrubbing liquid in such a manner that the scrubbing liquid partly vaporizes. The scrubbing liquid is preferably sprayed countercurrently in relation to the gases. The apparatus for the purification of gases consists of a scrubbing unit (3, 4), a drop separation unit (5), devices for circulating the scrubbing liquid countercurrently in relation to the gases, devices for the cooling, regeneration and recycling of the scrubbing liquid, and a pre-moistening unit (2) for the moistening of the gases.

3 Claims, 1 Drawing Figure

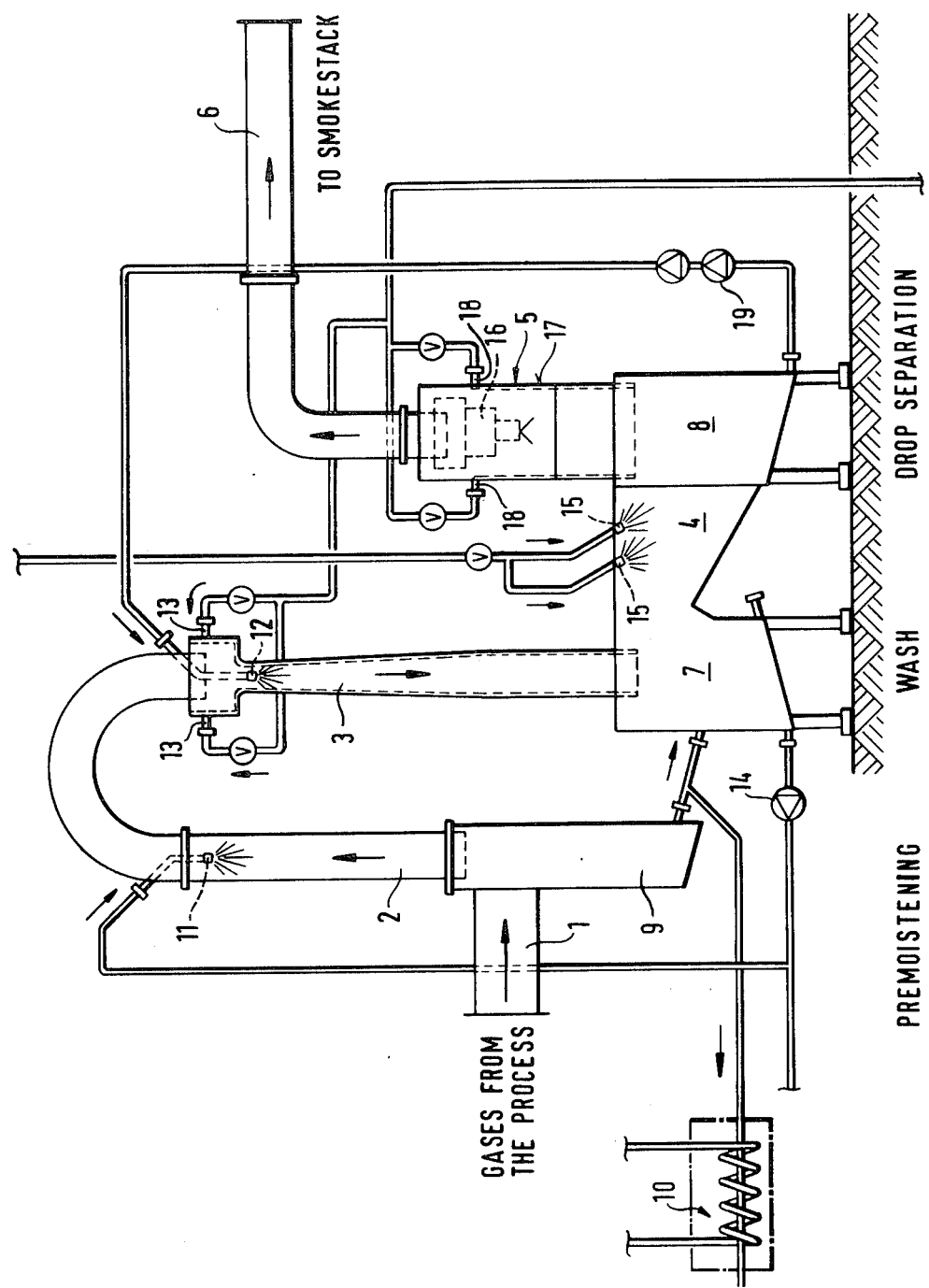

METHOD AND APPARATUS FOR THE PURIFICATION OF GASES WHICH CONTAIN SOLID AND GASEOUS IMPURITIES

BACKGROUND OF THE INVENTION

The invention relates to a method and apparatus for the scrubbing of gases. The invention relates in particular to the removal of gaseous and solid impurities from industrial flue gases.

The removal of impurities from flue gases is a problem to which a solution has been sought. Currently industry uses most commonly either venturi scrubbers or various types of filled beds. In a normal venturi scrubber system, the achievement of a good scrubbing requires either a wash with high-pressure water or a blower (high-pressure blower) for creating a sufficient velocity for the gases after the venturi. The scrubbing of gases takes place without pre-moistening.

Gases can also be purified by allowing them to flow through a filled bed. The bed can be composed of, for example, solid material or pieces of filler material, in which case the intention is to provide a large surface area to which the impurities can be adsorbed.

The object of the present invention is to provide an improved method for the purification of industrial flue gases of solid and gaseous impurities, and an apparatus therefore.

SUMMARY OF THE INVENTION

The gas scrubbing method according to the invention has three different stages: pre-moistening, scrubbing, and drop separation. Each of these stages may further consist of several different steps.

The essential characteristic of the scrubbing method according to the invention is that the gas to be purified is pre-moistened. In the pre-moistening the gases entering the scrubbing apparatus are moistened with a used scrubbing liquid obtained from the cycle. Scrubbing liquid in excess is directed to the pre-moistening in such a manner that part of it flows into a vessel situated below the pre-moistening tower. If it is desired to recover the heat from the gases already at this stage, a larger amount of scrubbing liquid can be used and the scrubbing liquid can be directed from the lower vessel into a heat exchanger.

During the pre-moistening, the gases flow upwards and the scrubbing liquid is sprayed downwards, countercurrently in relation to it. Since the temperature of the entering gases is high, part of the scrubbing liquid vaporizes, and the gases passing to the scrubbing stage are nearly saturated with vapor.

After the moistening, the gases flow to the actual scrubbing stage, into the venturi. There the gases are scrubbed with scrubbing liquid obtained from the cycle and with water. The scrubbing liquid is sprayed downwards in a direction parallel to the gas flow. The water sprays are directed tangentially to the entering gas flow, and at the same time they rinse the entire inner surface of the venturi and form a thin film of water from top to bottom, thereby keeping the inner mantle surface clean.

If the gases contain particles of solid material, the scrubbing liquid which has vaporized during the pre-moistening condenses under the effect of the sprayed scrubbing liquid in the venturi on the surfaces of the solid particles, thereby enhancing the separation of the solid material. If the gases do not contain solids but contain only gaseous impurities, the scrubbing liquid which has vaporized during the pre-moistening condenses into a fine mist during the scrubbing stage, whereby the amount of "scrubbing" surface is many times that produced in an ordinary scrubber. The condensing during the scrubbing stage of the scrubbing liquid which has vaporized during the pre-moistening causes a drastic shrinking of the volume of the gas to be scrubbed, and this increases the scrubbing efficiency. The shrinkage of the gas also results in a lowering of the pressure and an increase of the gas velocity. These changes of state of the scrubbing liquid, occurring in the scrubbing system, mean that the system requires no separate blower for sucking the gas into the scrubbing apparatus. The gaseous impurities and solids absorbed into the scrubbing liquid during the scrubbing stage accumulate in the vessel situated below the scrubbing stage, and the gases continue their passage to the connecting channel.

The gases arrive in the connecting channel, and also depart from there, tangentially. In the connecting channel the second scrubbing stage of the gases is carried out by means of fresh scrubbing liquid. This second stage is very effective, since the scrubbing liquid sprayed from the nozzles produces a gapless liquid curtain, through which the gases flow.

The scrubbing system according to the invention is characterized in that the scrubbing liquid used is cycled in such a manner that fresh scrubbing liquid meets the gases during the last scrubbing stage (connecting channel). From there the scrubbing liquid continues its passage into the venturi. From the vessel below the venturi there is a cycling to the pre-moistening.

The temperature of the gases drops considerably during the scrubbing and in particular in the connecting channel, where fresh scrubbing liquid is sprayed into the gases. As a result, drops are carried along with the gases, and these drops must be separated from the gases. The connecting channel serves not only as a scrubbing unit but also as a stage for the pre-separation of drops. The first separation of liquid drops from the gas takes place when the gases continue their passage tangentially from the connecting channel to the actual drop separation stage.

The gases rise from the connecting channel into the drop separation tower through a water film. In the upper part of the tower there are several drop separation cylinders, through which the gases pass. The liquid drops present in the gases adhere to the surface of the cylinders, and the water vapor still present in the gases condenses in the cylinders. The drops fall into a vessel situated below the cylinders. The cylinders are continuously rinsed with clean water, and so impurities and solids cannot accumulate in the cylinders. After the drop separation the gases continue their passage pure, and free of drops.

As mentioned above, the invention is characterized in that the scrubbing unit consists of three different stages: pre-moistening, scrubbing and drop separation. The description of the scrubbing method already indicated that each stage can also consist of several steps. It is also possible to link several scrubbing apparatuses in succession. The apparatus has proven to be especially effective for the scrubbing of gases which contain $SO_2$, Zn vapours and solids.

DESCRIPTION OF THE DRAWING

The FIGURE illustrates an elevated cross-sectional view of an apparatus according to the invention.

DESCRIPTION OF THE PREFERRED EMBODIMENT

Gases which contain impurities are directed tangentially from a pipe 1 into a pre-moistening pipe 2. Used scrubbing liquid is sprayed from the center of the tower via a nozzle 11 into the gas flow. Part of the scrubbing liquid vaporizes, part of it flows into a vessel 9, from which it can, depending on the amount of scrubbing liquid, be fed either directly or via a collection vessel 7 into a heat exchanger 10 and from there further to regeneration. The actual scrubbing is carried out in a venturi 3. The gases are directed to a converging point, where a once-used scrubbing liquid is sprayed at a suitable pressure into the gases. The velocity of the liquid which is sprayed in the travel direction of the gases must be at minimum the same as the velocity of the gases, preferably higher, in which case the liquid flow propels the gases. Tangentially directioned water nozzles 13 rinse the upper cone and the entire inner surface of the venturi, thereby forming a thin film of water from top to bottom and keeping the inner mantle surface clean. The scrubbing liquids of the main nozzle and the rinsing waters accumulate in the vessel 7, from which they are transferred to purification by means of a pump 14. The gases continue their passage into a connecting channel 4, where scrubbing is carried out by means of nozzles 15 spraying fresh, clean liquid.

The gases are directed tangentially into a drop separation tower 5, whereafter they rise through drop separation cylinders 16. Any drops of liquid possibly being carried along with the gases impinge against the surfaces of the cylinders, from where they flow down into a vessel 8. At the cylinders there is also a cylindrical mantle 17, through which nozzles 18 spray water tangentially onto the inner surface of the mantle 17 and partly onto the surfaces of the cylinders 16, which are thus maintained clean. The water which flows down along the inner surface of the cylinder mantle 17 forms a continuous film, through which the gases coming from the channel 4 into the drop separation tower 5 have to pass. The scrubbing liquid which has once come into contact with the gases is pumped from the vessel 8 by means of a high-pressure pump 19 into the main nozzle 12. The purified and cooled gases are discharged from the scrubbing apparatus via pipes 6.

EXAMPLE

The temperature of gas emerging from a flash smelting furnace via electric filters is approximately 200° C. and its $SO_2$ concentration approximately 14%. The scrubber has three stages (pre-moistening, scrubbing and drop-separation), and it operates according to the countercurrent principle. The gases are scrubbed with an approximately 5-percent soda lye. The sulfur dioxide combines, thereby forming sodium sulfite. The sodium sulfite solution is regenerated by means of lime, whereby calcium sulfite and sodium hydroxide are formed. The regenerated solution is recycled. Nearly 100% of the $SO_2$ can be separated from the gases.

What is claimed is:

1. A method for the purification of hot gases, especially industrial flue gases, comprising the steps of:
   (a) moistening the upward flowing hot gases in a pre-moistening stage by spraying them with a spray of downwards-directed scrubbing liquid obtained from a countercurrent cycle of the scrubbing liquid, flowing part of the scrubbing liquid into a vessel below the pre-moistening stage, nearly saturating the gases passing to the next stage with vaporized scrubbing liquid,
   (b) scrubbing and cooling the gases in the actual separation stage, in the venturi, by spraying the scrubbing liquid in a direction co-current to the gas flow, and also with spraying water directed tangentially to the entering gas flow, said water spray additionally rinsing a thin film of water onto the inner surface of the venturi, accumulating the gaseous impurities and solids absorbed into the scrubbing liquid and water into a vessel below the scrubbing stage, continuing the passage of the gases to the second scrubbing stage,
   (c) scrubbing the gases arriving in the second scrubbing stage, in the connecting channel, with fresh scrubbing liquid, producing gapless sprays, continuing the passage of the gases tangentially from the second scrubbing stage to the next stage and passing the scrubbing liquid flown into a vessel below the second separation stage into the venturi,
   (d) carrying the rising gases in the drop separation stage through a water film and passing them through several drop separation cylinders rinsed continuously with clean water, collecting the falling liquid drops and the water vapor still present in the gases into a vessel below the cylinders, and discharging the drop-free purified gases.

2. The method according to claim 1, in which the heat content of the scrubbing liquid is recovered.

3. An apparatus for the purification of gases, especially for the purification of industrial flue gases, the apparatus comprising:
   (a) a pre-moistening tower for moistening the upward-flowing gases by means of sprays of a scrubbing liquid via a nozzle directed downwards;
   (b) a venturi, connected to the output of said pre-moistening tower, for scrubbing and cooling of the gases pre-moistened with the scrubbing liquid and exiting said pre-moistening tower at a converging point of the venturi via a main nozzle liquid spray, and also with water directed tangentially via water nozzles;
   (c) a connecting channel connected to the gas output of the venturi and having means for scrubbing the gases with fresh scrubbing liquid directed via nozzles; the connecting channel being connected to
   (d) a drop separation tower having a tangential inlet and having perforated cylinders for separating drops from the gases entering tangentially and rising upwards through the drop separation tower;
   (e) vessels connected to and below the pre-moistening tower, the venturi, the connecting channel and the drop separation tower for collecting the scrubbing liquid and water flown downwards;
   (f) means for circulating the scrubbing liquid recovered from the drop separation tower and for circulating it to the main nozzle of the venturi; and
   (g) means for circulating the scrubbing liquid collected from the venturi to the pre-moistening tower and collected from the drop separation tower to the nozzle of the venturi.

* * * * *